(12) United States Patent
Conklin

(10) Patent No.: US 7,154,555 B2
(45) Date of Patent: Dec. 26, 2006

(54) AUTOMATIC DEINTERLACING AND INVERSE TELECINE

(75) Inventor: Gregory J. Conklin, Seattle, WA (US)

(73) Assignee: Realnetworks, Inc., Seattle, WA (US)

( * ) Notice: Subject to any disclaimer, the term of this patent is extended or adjusted under 35 U.S.C. 154(b) by 579 days.

(21) Appl. No.: 10/340,376

(22) Filed: Jan. 10, 2003

(65) Prior Publication Data

US 2004/0135924 A1    Jul. 15, 2004

(51) Int. Cl.
*H04N 3/27* (2006.01)
*H04N 5/14* (2006.01)
*H04N 5/46* (2006.01)
*H04N 5/253* (2006.01)
*H04N 9/47* (2006.01)
*H04N 9/64* (2006.01)

(52) U.S. Cl. .................. 348/448; 348/96; 348/441; 348/452; 348/459; 348/554; 348/555; 348/556; 348/558; 348/699; 348/700; 348/701

(58) Field of Classification Search .......... 348/96–97, 348/441, 448, 452, 459, 554–556, 558, 699–701
See application file for complete search history.

(56) References Cited

U.S. PATENT DOCUMENTS

| | | | | |
|---|---|---|---|---|
| 5,742,351 A | * | 4/1998 | Guede ................... 348/459 |
| 5,754,248 A | * | 5/1998 | Faroudja ................ 348/474 |
| 5,757,435 A | | 5/1998 | Wells |
| 5,812,202 A | | 9/1998 | Ng et al. |
| 5,821,991 A | | 10/1998 | Kwok |
| 5,828,786 A | * | 10/1998 | Rao et al. ............... 382/236 |
| 5,847,772 A | | 12/1998 | Wells |
| 5,864,368 A | * | 1/1999 | Kato et al. .............. 348/446 |
| 5,929,902 A | | 7/1999 | Kwok |
| 6,014,182 A | * | 1/2000 | Swartz ................... 348/700 |
| 6,157,412 A | * | 12/2000 | Westerman et al. ..... 348/558 |
| 6,160,589 A | * | 12/2000 | Sadowski ............... 348/526 |
| 6,222,589 B1 | * | 4/2001 | Faroudja et al. ........ 348/448 |
| 6,380,978 B1 | * | 4/2002 | Adams et al. .......... 348/452 |
| 6,525,774 B1 | | 2/2003 | Sugihara |
| 6,538,688 B1 | | 3/2003 | Giles |
| 6,545,727 B1 | * | 4/2003 | Pau et al. ............... 348/700 |
| 6,549,668 B1 | * | 4/2003 | Pezzoni et al. ......... 382/236 |
| 6,563,550 B1 | * | 5/2003 | Kahn et al. ............. 348/700 |
| 6,670,996 B1 | * | 12/2003 | Jiang .................... 348/558 |
| 6,700,622 B1 | * | 3/2004 | Adams et al. .......... 348/448 |
| 6,724,433 B1 | * | 4/2004 | Lippman ................ 348/558 |
| 6,839,094 B1 | * | 1/2005 | Tang et al. ............. 348/607 |
| 6,842,194 B1 | * | 1/2005 | Sugihara ................ 348/441 |
| 6,867,814 B1 | * | 3/2005 | Adams et al. .......... 348/448 |
| 6,870,568 B1 | * | 3/2005 | Hui ....................... 348/458 |
| 6,873,368 B1 | * | 3/2005 | Yu et al. ................ 348/441 |
| 6,897,903 B1 | * | 5/2005 | Hu ........................ 348/700 |
| 6,904,173 B1 | * | 6/2005 | Bagni et al. ........... 382/236 |
| 6,952,212 B1 | * | 10/2005 | Nister et al. ............ 345/474 |
| 2001/0002853 A1 | * | 6/2001 | Lim ....................... 348/558 |
| 2001/0002921 A1 | * | 6/2001 | Bagni et al. ........ 375/240.16 |
| 2001/0026328 A1 | * | 10/2001 | Del Corson ............ 348/558 |

(Continued)

*Primary Examiner*—Brian P. Yenke
(74) *Attorney, Agent, or Firm*—Steven Stewart

(57) ABSTRACT

A video apparatus is provided with automatic deinterlacing and inverse telecine pre-filtering capability to automatically analyze the frames of the video to determine at least whether the video is one of telecine, non-telecine progressive and non-telecine interlaced formatted, and to automatically reformat the video into a non-telecine progressive format if the video is determined to be one of telecine and non-telecine interlaced formatted.

77 Claims, 8 Drawing Sheets

U.S. PATENT DOCUMENTS

2002/0057368 A1* 5/2002 Fakhruddin .................. 348/558
2002/0130970 A1* 9/2002 Jiang .......................... 348/459
2002/0149703 A1* 10/2002 Adams et al. .............. 348/700
2003/0206242 A1* 11/2003 Choi ........................... 348/441
2004/0001159 A1* 1/2004 Shen et al. .................. 348/441

* cited by examiner

AUTOMATIC DEINTERLACING AND INVERSE TELECINE

FIELD OF THE INVENTION

The present invention relates to the field of video processing. More specifically, the present invention is related to automatic detection and conversion of video from one of a number of formats to a format of choice.

BACKGROUND OF THE INVENTION

Advances in microprocessor, networking and related technologies have led to wide spread deployment and adoption of server-client based applications. In particular, with the advance of high speed public networks, such as the Internet, increasing amounts of rich content, such as video, are being served and available for consumption by networked clients.

For a variety of reasons, most client devices are equipped with progressive scan monitors. Resultantly, video contents are typically encoded and streamed to client devices for consumption in a progressive format. While a substantial volume of video content is available in the progressive format, there exist also large volumes of video contents in other formats, such as the interlaced format or the telecine format (which may be progressive or interlaced).

Interlaced format video typically consists of fields and frames. See FIG. 6a. A field is a set of either the even scan lines or odd scan lines at a particular instant in time. A frame is a set of one even field interleaved (i.e. interlaced) with one temporally neighboring odd field. The even and odd fields typically do not represent the video at the same time, but are instead separated by some small amount of time, e.g. 1/60 or 1/50 of a second. As a result, viewing of a single frame of interlaced video, especially when motion is present, can be rather unnatural, due to the motion interlaced artifacts caused by the time difference between the fields. These artifacts are often referred to or known as "interlace lines" or "interlaced fingers".

Telecine generally refers to the process of converting 24 frame-per second (fps) progressive format (e.g. from film) to 30 fps interlaced (e.g. NTSC, National Television Standard Committee). The process typically involves repeating certain fields of the video, in e.g. a 3:2 pattern. See FIG. 6b.

A number of deinterlacers and telecine inverters to deinterlace interlaced or invert telecine formatted videos to a progressive format are known in the art, and available for use by video providers to accomplish the conversion. However, under the prior art, the responsibility of selecting and invoking the appropriate reformatter, i.e. a deinterlacer or a telecine inverter, rests on the user operators of a video provider.

Unfortunately, user operators of video providers often do not know the content format well enough to invoke the appropriate "reformatter". The task is further complicated by the fact that many videos are mixed formats, e.g. a telecine formatted video may contain one or more portions of interlaced video.

Thus, availability of methods and/or apparatuses to automatically detect and reformat video from one of a number of formats to a format of choice is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes components of a video device, methods of operations practiced thereon, video devices and systems so formed, and other related subject matters.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in video processing terminology consistent with the manner commonly employed by those skilled in the art to convey the substance of their work to others skilled in the same art. These terms, for the purpose of this application, are to be accorded their commonly understood meaning. In particular, in a video processing device, a video and its associated data may take the form of electrical, magnetic, or optical signals capable of being stored, transferred, combined, and otherwise manipulated through electrical and/or optical components of a processor, and its subsystems.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
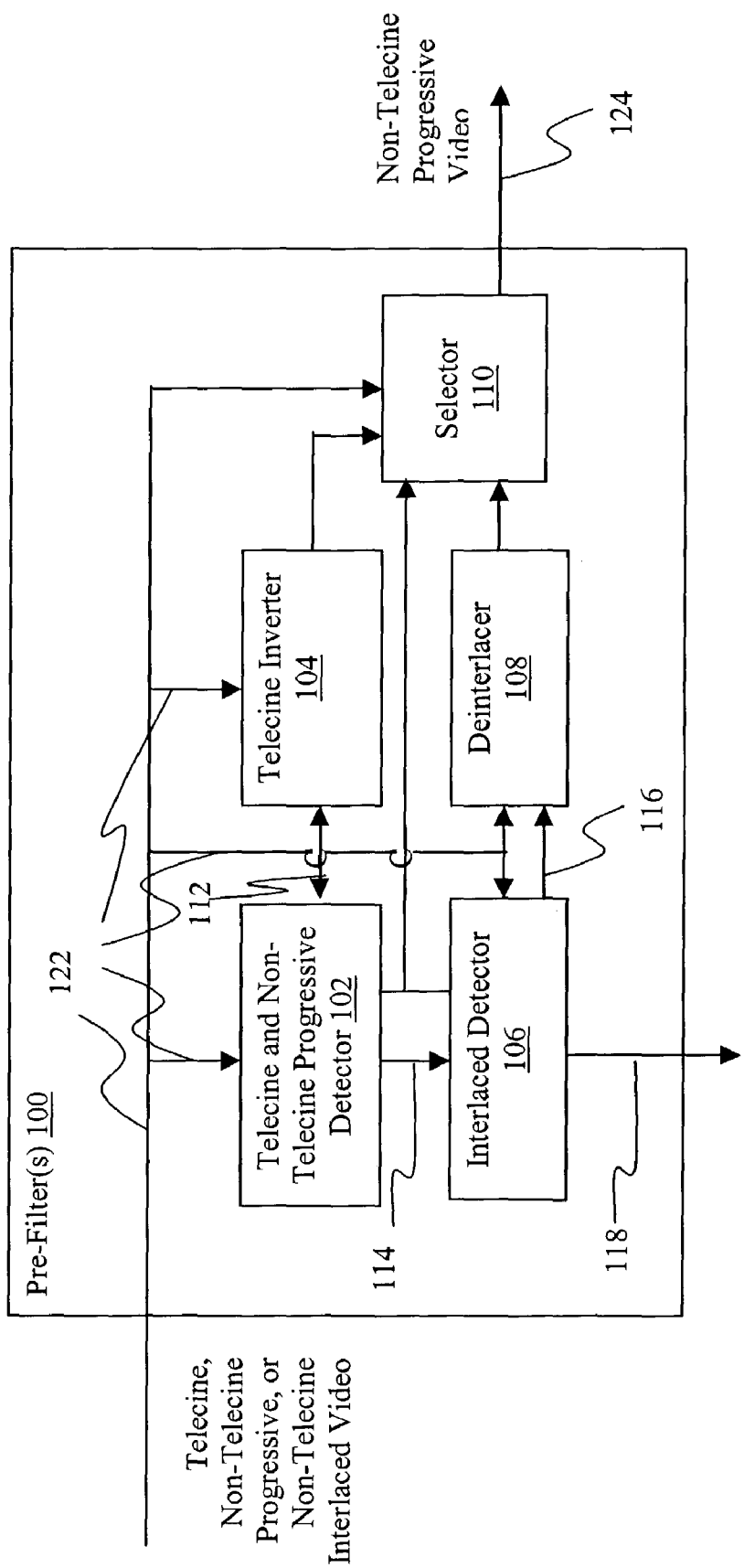
FIG. 1 illustrates an overview of a pre-filter arrangement of the present invention, in accordance with one embodiment.

FIG. 1 illustrates an overview of the present invention, in accordance with one embodiment. As illustrated, the present invention includes pre-filter arrangement 100 having particular application, i.e. usage, in a video device. For the illustrated embodiment, pre-filter arrangement 100 includes telecine and non-telecine progressive detector 102, telecine inverter 104, interlaced detector 106, and deinterlacer 108. Further, pre-filter arrangement 100 of FIG. 1 also includes selector 110. The elements, i.e. elements 102–110, are coupled to each other as shown.

Together, elements 102–110 cooperate to automatically determine whether an input video 122 is one of telecine, non-telecine progressive or non-telecine interlaced formatted. Further, if input video 122 is determined to be either telecine or non-telecine interlaced formatted, elements 102–110 cooperate to automatically convert the video from either telecine or non-telecine interlaced format to non-telecine progressive formatted video 124.

More specifically, telecine and non-telecine progressive detector 102 is used to automatically determine whether input video 122 is telecine or non-telecine formatted, and to automatically determine whether a non-telecine formatted video 122 is progressive formatted. Telecine inverter 104 is used to automatically invert telecine formatted video 122 into non-telecine progressive formatted video 122.

Interlaced detector 106 is used to automatically determine whether non-telecine formatted video 122 is interlaced, and deinterlacer 108 is used to deinterlace interlaced video 122.

Resultantly, a user of a video device (e.g. video device 700 of FIG. 7) formed with pre-filter arrangement 100 does not have to be responsible for knowing the format of the input video, nor responsible for invoking the proper pre-filter or pre-filters to pre-filter the input video.

For the illustrated embodiment, telecine inverter 104 also informs telecine and non-telecine progressive detector 102 of frames dropped during the inversion process, to facilitate detector 102 in detecting progressive patterns by analyzing the number of frames of video 122 consistent with the interlaced or progressive pattern, to be described more fully below. Detector 102 also notifies deinterlaced detector 106 of whether detector 102 was able to detect progressive patterns (in the event input video 122 is not considered to be telecine formatted). Further, both detectors 102 and 106 also notify selector 110 of the results of their respective determinations, allowing selector 110 to select the proper source, i.e. video 122 itself, output of telecine inverter 104 or output of deinterlacer 108 to output as non-telecine progressive formatted video 124.

In an alternate embodiment, e.g. a software implementation, where inverter 104, interlaced detector 106, and deinterlacer 108 are selectively enabled/invoked to operate on input video 122 on an as needed basis, the present invention may be practiced without employing selector 110.

Telecine and non-telecine progressive detector 102 (except for the concurrent progressive detection aspect) is the subject matter of U.S. patent application Ser. No. 09/732,217, entitled Automated Inverse Telecine Conversion, filed on Dec. 6, 2000. Telecine inverter 104 and deinterlacer 108 are known in the art. Accordingly, these elements or the known aspects of these elements will not be further described.

The progressive detection aspect of telecine and non-telecine progressive detector 102, and interlaced detector 106, along with other aspects of the present invention, will be further described in turn below.

Before doing so, it should be noted that, while for ease of understanding, the present invention is being described with an embodiment equipped to automatically detect telecine, non-telecine progressive and non-telecine interlaced video, and automatically convert telecine and non-telecine interlaced video to non-telecine progressive video, the present invention anticipates the described embodiment may also be practiced with automatic detection and conversion of other known formats.

Method View

Figure 2:
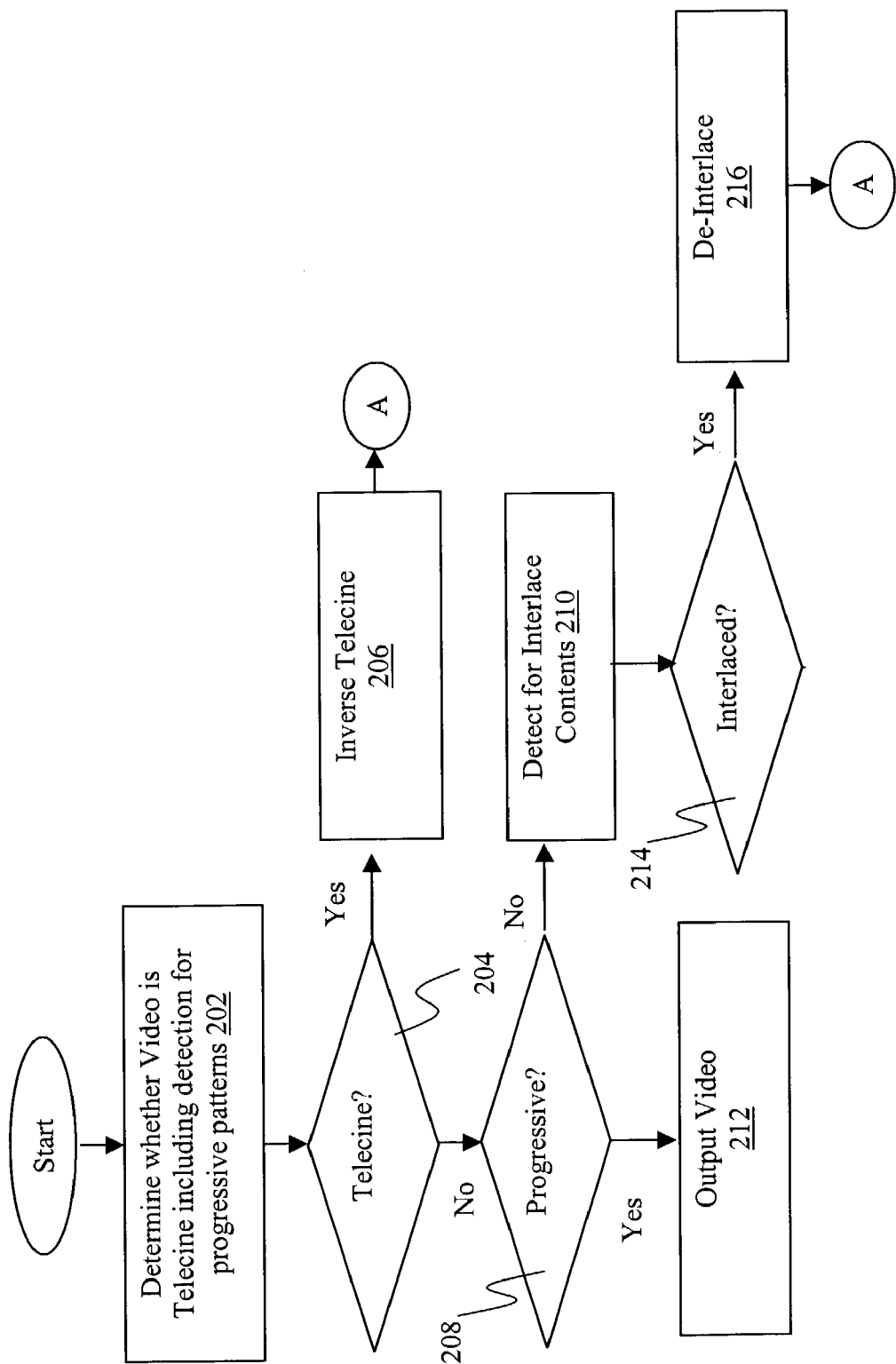
FIG. 2 illustrates a method view of the present invention, in accordance with one embodiment.

FIG. 2 illustrates a method view of the present invention, in accordance with one embodiment. As illustrated and alluded to earlier, pre-filter arrangement 100 is invoked to automatically determine whether an input video is telecine formatted, including detection for presence of progressive patterns, block 202.

If the input video is automatically determined to be telecine formatted, block 204, the input video is automatically inverted to be non-telecine progressive formatted, block 206, before being outputted, block 212, e.g. to an encoder.

On the other hand, if the input video is automatically determined to be non-telecine, but progressive formatted, block 208, the input video is outputted directly, block 212, e.g. to an encoder.

However, if the input video is determined to be neither telecine nor non-telecine progressive formatted, the input video is further analyzed to determine if the input video is interlaced formatted, block 210. If the input video is determined to be non-telecine interlaced formatted, block 214, the input video is automatically deinterlaced, block 216, before being outputted, block 212.

Automatic Progressive Detection

Figure 3:
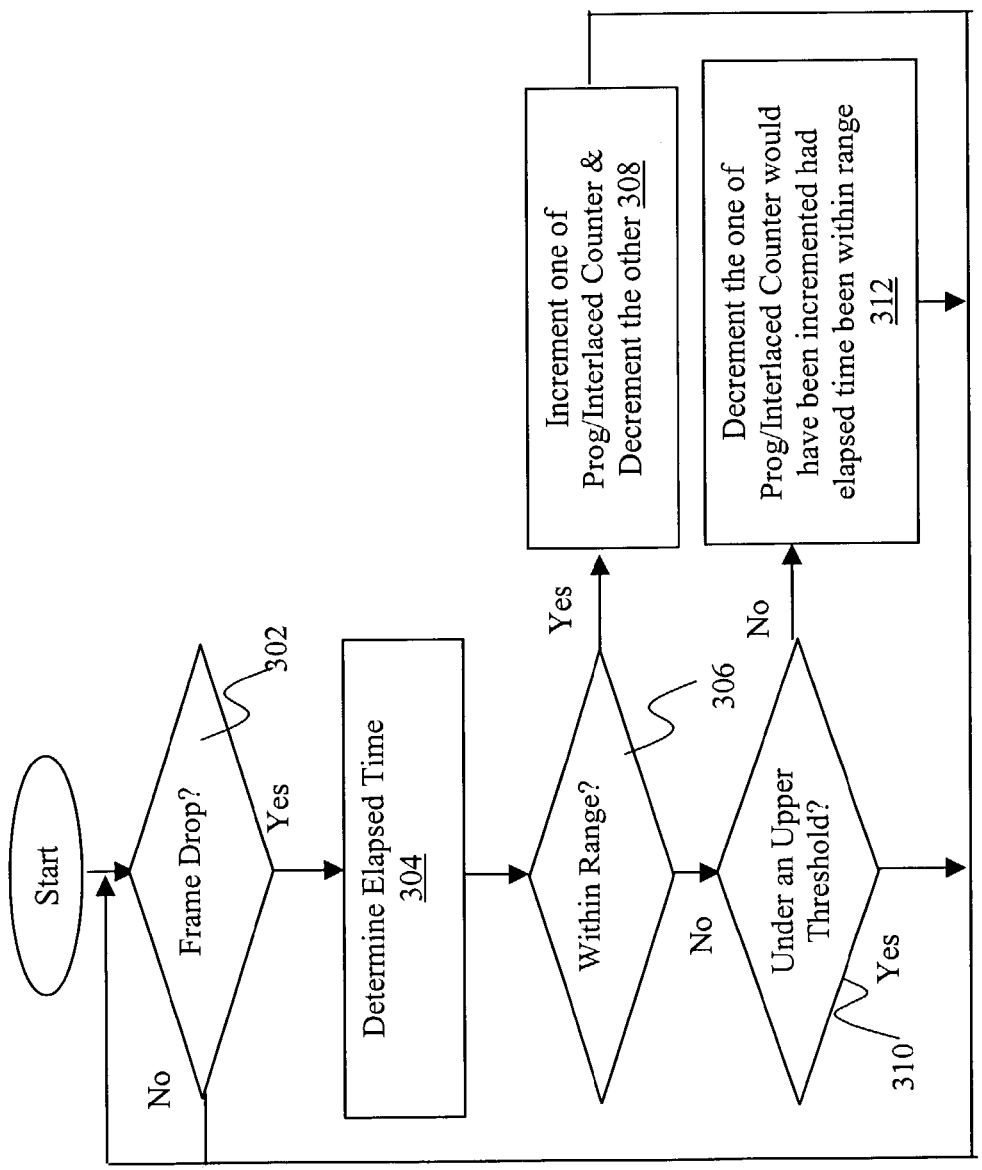
FIG. 3 illustrates the operational flow of the progressive detection aspect of the telecine detection portion of the pre-filter arrangement of the present invention, in accordance with one embodiment.

FIG. 3 illustrates the operational flow for the progressive detection aspect of telecine and non-telecine progressive detector 102 of FIG. 1, in accordance with one embodiment. For the embodiment, telecine and non-telecine progressive detector 102 analyzes the input video for progressive or interlaced patterns, and the number of frames that are consistent with having progressive or interlaced patterns. More specifically, telecine and non-telecine progressive detector 102 analyzes the elapsed times between successive frames being dropped by inverter 104 (as part of the telecine inversion process) to determine whether input video 122 is progressive formatted. More specifically, detector 102 analyzes the elapsed times between successive dropped frames to determine whether the elapsed times are substantially consistent with an expected amount of elapsed time between successive dropped frames, if the input video is progressive formatted. In one embodiment, the expected amount of elapsed time between successive dropped frames may be 167 ms (the time duration of 5 frames).

Identification of frames to be dropped is a by-product of the telecine inversion process, as described earlier, telecine typically involves converting 24 fps progressive format (e.g. from film) to 30 fps (e.g. NTSC). The process involves repeating certain frames of the video in e.g. a well known 3:2 pattern. Thus, inverse telecine will necessarily involve converting 30 fps (e.g. NTSC) back to 24 fps, resulting in one in every 5 input frames being dropped.

As illustrated, the progressive detection portion of telecine and non-telecine progressive detector 102 monitors for frames being dropped, block 302. On detection, detector 102 determines an amount of time elapsed since the last time a frame was dropped, block 304.

On determination, detector 102 determines whether the amount of time elapsed since the last time a frame was dropped is within an expected range (encompassing the expected elapsed time), block 306. In one embodiment, the expected range may be from 145 ms to 175 ms (encompassing the expected elapsed time of 167 ms).

If the amount of time elapsed since the last time a frame was dropped is within an expected range, detector 102 increments either a progressive counter or an interlaced counter by an amount, block 308. Whether the progressive counter or the interlaced counter gets incremented depends on whether detector 102 has detected progressive or interlaced telecine patterns, as part of its mainline telecine analysis. If detector 102 has detected progressive telecine patterns, the progressive counter is incremented. On the other hand, if detector 102 has detected interlaced telecine patterns, the interlaced counter is incremented.

For the embodiment, as detector 102 increments either the progressive or interlaced counter as described above, it also decrements the other counter by an amount. In one embodiment, the amounts are the same. More specifically, in one embodiment, the counters are initialized to zero on start up, and the increment/decrement amount may be set to 5.

On incrementing/decrementing the progressive/interlaced counter as described, the process continues back at block 302.

Back at block 306, if the amount of elapsed time is determined not to be within the expected range, for the embodiment, detector 102 further determines whether the amount of elapsed time is below an upper threshold, block 310. If the amount of elapsed time is below the upper threshold, detector 102 similarly decrements one of the progressive or interlaced counter by an amount, block 320. Again, whether the progressive or interlaced counter is decremented depends on whether detector 102 has detected progressive or interlaced telecine patterns in its mainline analysis. If detector 102 has detected progressive telecine patterns, the progressive counter is decremented. On the other hand, if detector 102 has detected interlaced telecine patterns, the interlaced counter is decremented. In one embodiment, the amounts are the same, and may be set to 5 also.

Similarly, on incrementing/decrementing the progressive/interlaced counter as described, the process continues back at block 302.

Automatic Interlaced Detection

Figure 4:
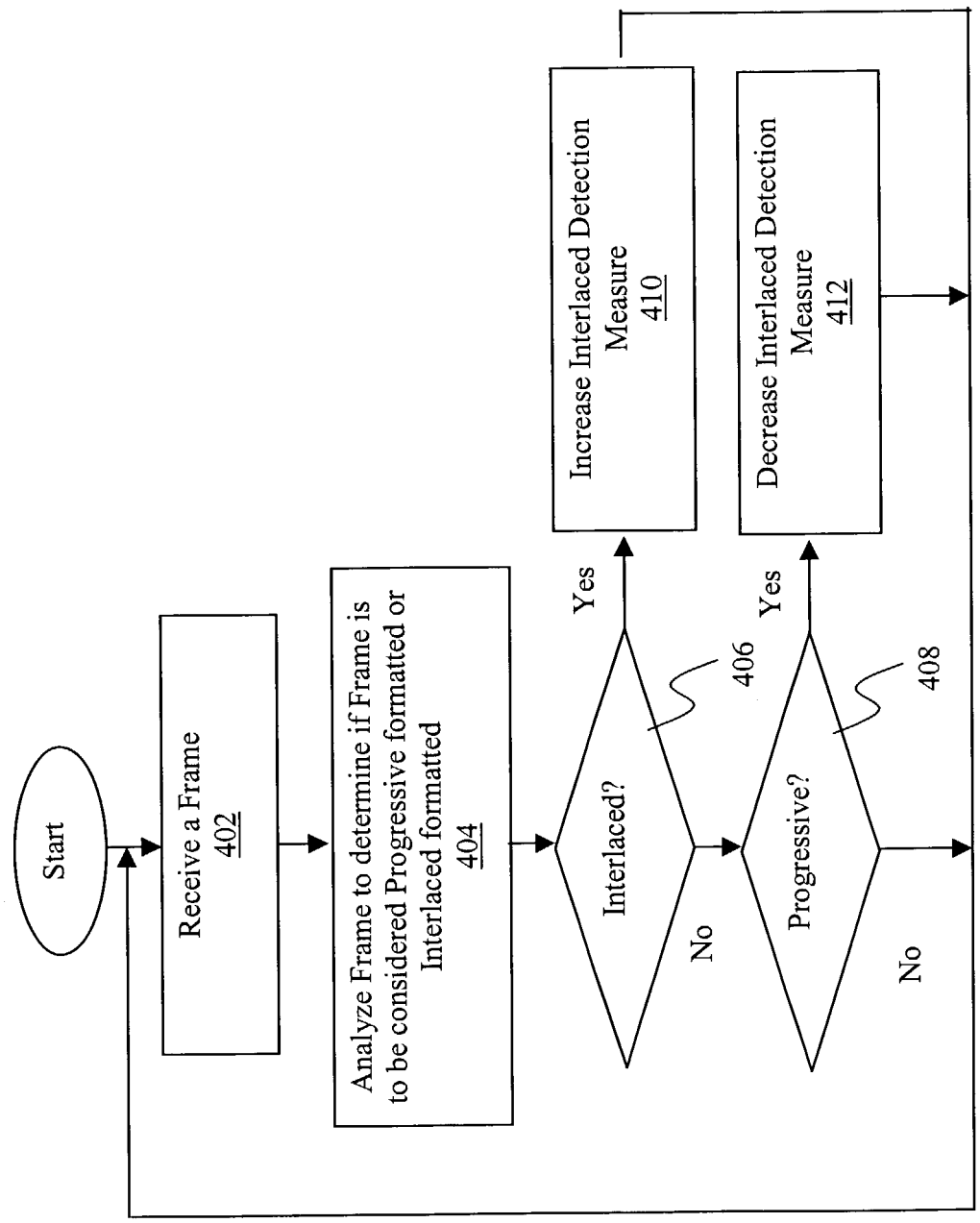
FIG. 4 illustrates the operational flow of the interlaced detection portion of the pre-filter arrangement of the present invention.
Figure 5:
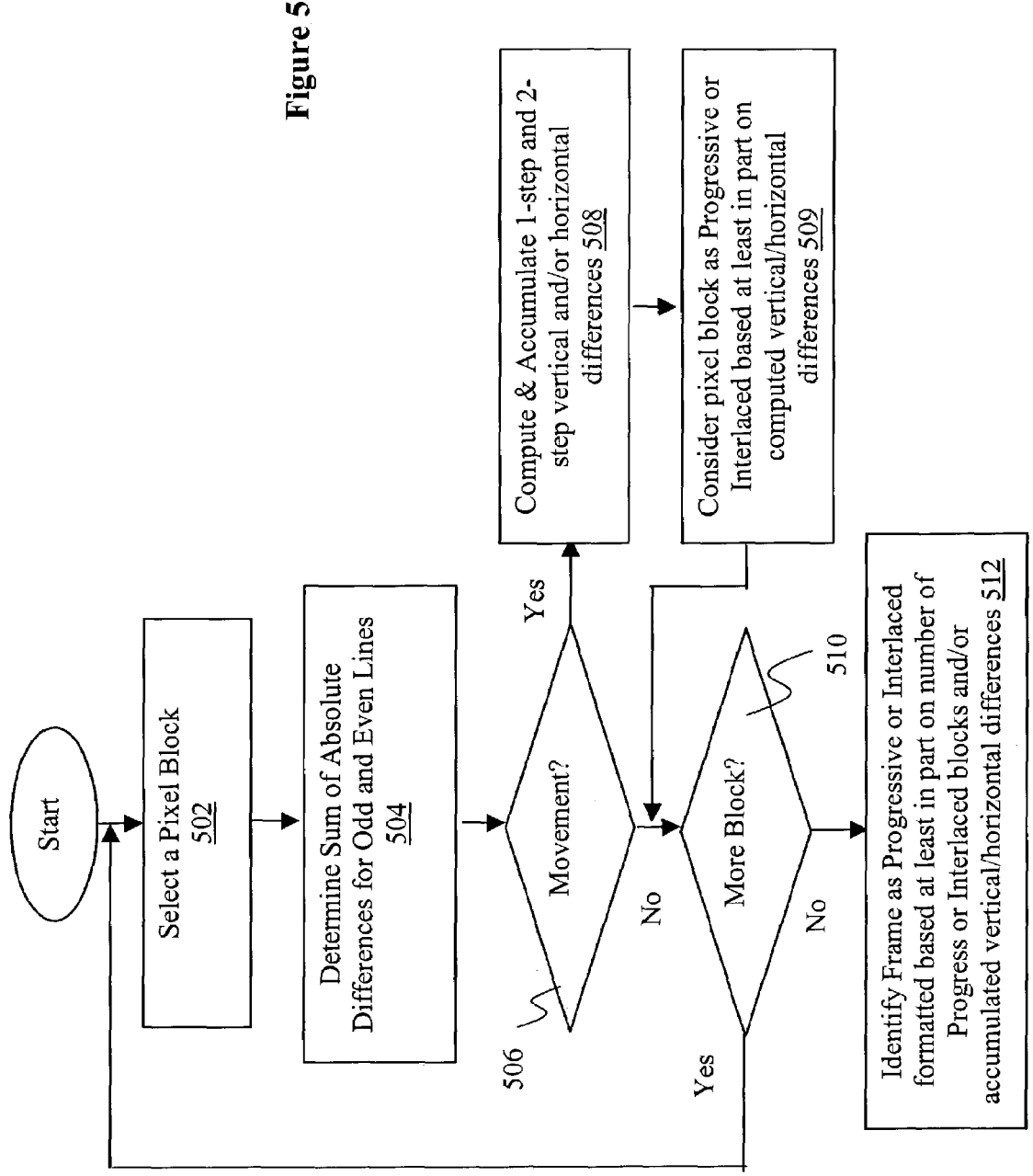
FIG. 5 illustrates the operational flow for determining whether a frame is interlaced formatted, in further detail, in accordance with one embodiment.
Figure 6B:
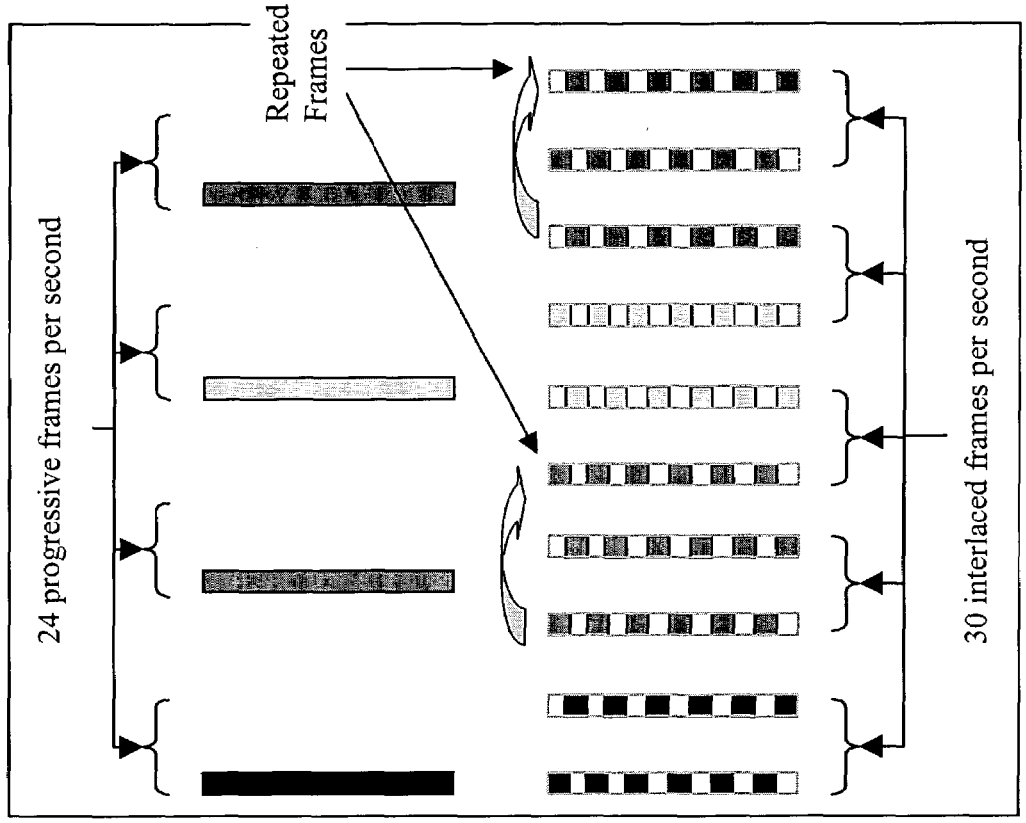
FIG. 6b illustrates telecine formatting of video.
Figure 6A:
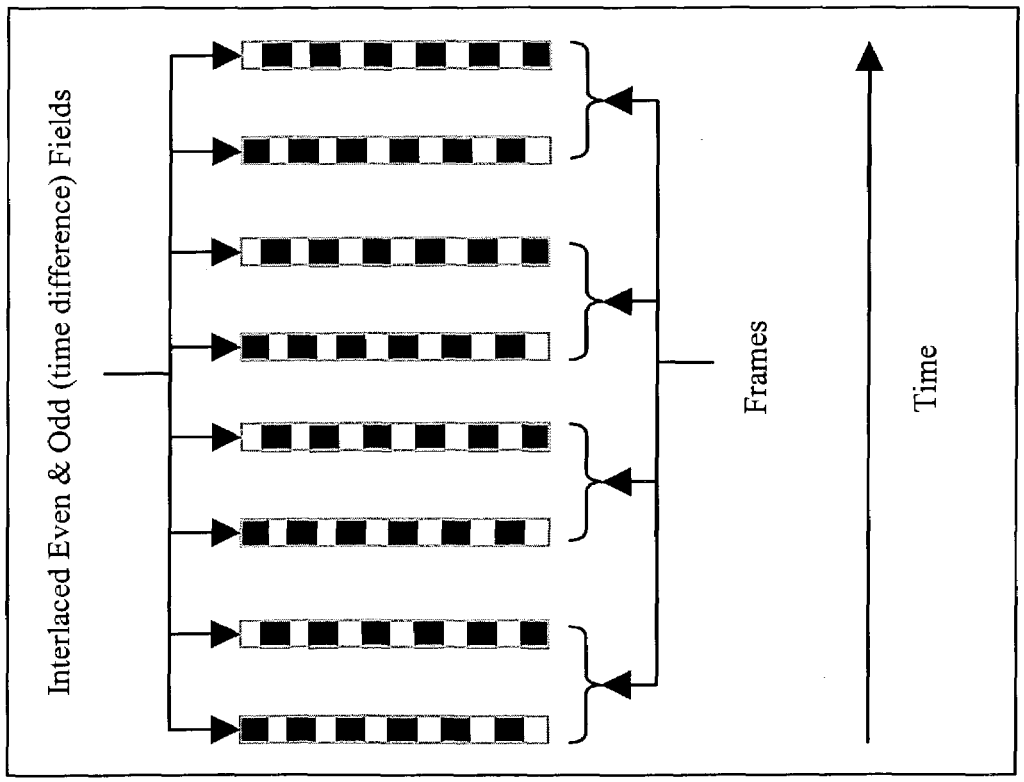
FIG. 6a illustrates interlaced formatting of video.
Figure 6C:
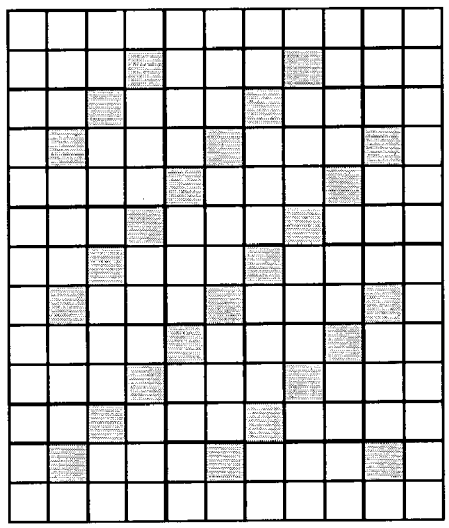
FIG. 6c illustrates a "sub-sampling" arrangement for determining whether a frame is interlaced formatted by examining only a subset of the pixel blocks of a frame, in accordance with one embodiment.

FIGS. 4–6 illustrate the operational flow of interlaced detector 106 of FIG. 1, in accordance with one embodiment. The embodiment determines whether video 122 is interlaced formatted through a frame-by-frame analysis. Further, the analysis of each frame is performed by dividing the frame into pixel blocks, and have the pixel blocks analyzed. In one embodiment, whether a frame is interlaced formatted is inferred from the analysis of a selected subset of the pixel blocks. FIG. 4 illustrates the overall operational flow of the frame-by-frame analysis, and FIG. 5 illustrates the operational flow of the pixel block analysis. FIG. 6c illustrates a configuration of the pixel blocks being analyzed, on which inference about a frame may be drawn.

Referring now to FIG. 4, as illustrated, upon invocation, interlaced detector 106 receives a frame of video 122, block 402. On receipt of a frame, detector 106 analyzes the frame to determine whether the frame is to be considered progressive formatted or interlaced formatted, blocks 404–408. As alluded to earlier, in one embodiment, the conclusion is drawn from a pixel block analysis, to be described more fully below.

If the frame is to be considered interlaced formatted, detector 106 increments an interlaced detection measure (detection_measure), block 410. On the other hand, if the frame is to be considered progressive formatted, detector 106 decrements the interlaced detection measure, block 412. Upon incrementing/decrementing the interlaced detection measure, the process continues back at block 402.

If the video cannot be considered as either progressive or interlaced formatted, the interlaced detection measure is left unchanged, and the process immediately continues back at block 402.

In one embodiment, on start up, the interlaced detection measure is initialized to zero, and on conclusion that a frame is to be considered as interlaced formatted, the interlaced detection measure may be incremented as follows:

$$\text{detection\_measure}=(31*\text{detection\_measure}+256)/32 \qquad (1)$$

On conclusion that a frame is to be considered as progressive formatted, the interlaced detection measure may be decremented as follows:

$$\text{detection\_measure}=(31*\text{detection\_measure}+0)/32 \qquad (2)$$

In one embodiment, the video is to be considered interlaced if the interlaced detection measure reaches a threshold. In one embodiment, the threshold may be 16.

In one embodiment, where each frame of video 122 has more than 242 lines, the interlaced detection measure may be initialized at 16 instead.

Referring now to FIG. 5, as described earlier, when analyzing a frame to determine whether the frame is to be considered interlaced formatted, interlaced detector 106 analyzes a M×N pixel block of the frame at a time, block 502. In one embodiment, the size of a pixel block may be an 8×8 block. In alternate embodiments, a frame may be analyzed via pixel blocks of other sizes.

On selecting a pixel block, detector 106 computes difference measurements for even and odd lines of the pixel block to determine if there are sufficient movements in the pixel block to facilitate interlaced detection, block 504. The operational is performed as adjacent fields of an interlaced frame often contain data of slightly different times, e.g. by ⅟₆₀ or ⅟₅₀ of a second, and sufficient presence of movements enable discernment of such time differential.

In one embodiment, the sum of absolute differences (SAD) is used for the difference measurement for even and odd lines (SAD_even and SAD_odd) and may be computed as follows:

$$\text{SAD\_even} = \sum_{i=0}^{M-1} \sum_{j=0}^{N/2-1} |p(i, 2j) - q(i, 2j)| \tag{3}$$

$$\text{SAD\_odd} = \sum_{i=0}^{M-1} \sum_{j=0}^{N/2-1} |p(i, 2j+1) - q(i, 2j+1)| \tag{4}$$

where p(x,y) is the luma-plane pixel value located x pixels to the right and y pixels down from the upper-left edge of the current 8×8 block;

q(x,y) is the pixel located at a corresponding position in the previous frame.

In alternate embodiments, the reference point may be a pixel at another location other than the upper-left edge of the pixel block.

In one embodiment, the SADs may be sub-sampled to reduce the amount of calculations. Specifically, the SADs may be calculated as follows:

$$\text{SAD\_even} = 2 \sum_{i=0}^{M/2-1} \sum_{j=0}^{N/2-1} |p(2i, 2j) - q(2i, 2j)| \tag{5}$$

$$\text{SAD\_odd} = 2 \sum_{i=0}^{M/2-1} \sum_{j=0}^{N/2-1} |p(2i+1, 2j+1) - q(2i+1, 2j+1)| \tag{6}$$

On computing SAD_even and SAD_odd, detector 106 compares the computed SAD_even and SAD_odd to a movement threshold to determine whether the pixel block is to be considered as having sufficient movement to facilitate interlaced detection, block 506. In one embodiment, the movement threshold may be 400.

If the pixel block is determined to have sufficient movement to facilitate interlaced detection, detector 106 computes a number of one or more step vertical and/or horizontal differences for the pixel block, and accumulates the computed vertical/horizontal differences, block 508.

In one embodiment, a 1-step vertical difference (step1v), a 2-step vertical difference (step2v), a 1-step horizontal difference (step1h), and a 2-step horizontal difference (step2h) are computed. The 1 and 2-step vertical and horizontal differences may be computed as follows:

$$step1v = \sum_{i=0}^{M/2-1} \sum_{j=0}^{N/2-1} (p(2i+1, 2j) - p(2i+1, 2j+1))^2 \tag{7}$$

$$step2v = \sum_{i=0}^{M/2-1} \sum_{j=0}^{N/2-1} (p(2i+1, 2j) - p(2i+1, 2j+2))^2 \tag{8}$$

$$step1h = \sum_{i=0}^{M/2-1} \sum_{j=0}^{N/2-1} (p(2i, 2j+1) - p(2i+1, 2j+1))^2 \tag{9}$$

$$step2h = \sum_{i=0}^{M/2-1} \sum_{j=0}^{N/2-1} (p(2i, 2j+1) - p(2i+2, 2j+1))^2 \tag{10}$$

On computing the step differences, detector 106 determines whether the pixel block is to be considered interlaced or progressive, block 509. If so, for the embodiment, interlaced detector 106 increments an interlaced block counter interlaced_blocks or a progressive block counter progressive_blocks by 1 accordingly.

In one embodiment, detector 106 increments the interlaced and progressive block counters, interlaced_blocks and progressive_blocks as follows:

If step1v>step2v and step1h<$T_1$ and step2v<$T_2$, then the block is classified as interlaced, and the interlaced counter interlaced_blocks is incremented by 1.

If step1v<2×step2v and step1h<$T_3$ and step1v<$T_4$, then the block is classified as progressive, and the progressive counter progressive_blocks is incremented by 1.

In one embodiment, $T_1=T_2=T_3=T_4=T$, and T may be 25600.

In one embodiment, the operation at block 508 also includes accumulating the computed values of step1v, step2v, step1h, and step2h of each analyzed block into four corresponding running variables step1v_total, step2v_total, step1h_total, and step2h_total for the frame. For the embodiment, these variables, in addition to the counters interlaced_blocks and progressive_blocks are also later used in the determination whether the frame is to be considered interlaced.

On computing step1v, step2v, step1h, and step2h, accumulating step1v_total, step2v_total, step1h_total, and step2h_total, and determining whether the analyzed block is to be considered interlaced or progressive, blocks 508–509, detector 106 determines if there are more blocks to analyze, block 510. If so, the process continues back at block 502. If all pixel blocks have been analyzed, then detector 106 proceeds to determine whether the frame is to be considered interlaced formatted.

As described earlier, in one embodiment, the pixel block analysis is performed using a subset of the pixel blocks. In one embodiment, the pixel blocks of a frame analyzed are the "shaded" pixel blocks of a frame as illustrated in FIG. 6. The ratio of the number of pixel blocks analyzed (e.g. 1 of 4) is referred to as a "Skip Factor". For the embodiment, the interlaced and progressive counters, i.e. interlaced_blocks and progressive_blocks, may be multiplied accordingly by the "Skip Factor".

In one embodiment, detector 106 determines whether the frame is to be considered interlaced formatted as follows:

A frame is considered to be interlaced

If interlaced_blocks>progressive_blocks and interlaced_blocks>width×height/4096 or If step1v_total×step2h_total>step1h_total×step2c_total and step1v_total>step2v_total and 2×interlaced_blocks>progressive_blocks and interlaced_blocks>width×height/1024

A frame is to be considered progressive

If progressive_blocks>width×height/1024 and progressive_blocks>16×interlaced_blocks where width and height are in units of pixels.

Video Device, Article of Manufacture & Video System

Figure 7:
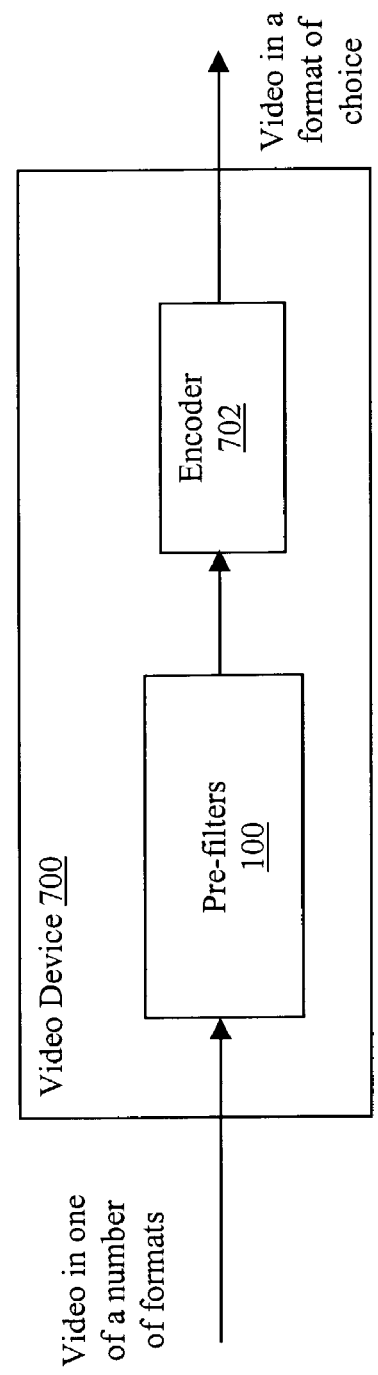
FIG. 7 illustrates an article of manufacture with a recordable medium having a software implementation of the present invention, designed for use to program a video device to equip the device with the present invention, in accordance with one embodiment.

FIG. 7 illustrates a video device formed using pre-filter arrangement 100 of the present invention. As illustrated, video device 700, in addition to pre-filter arrangement 100, may include encoder 702. The elements are coupled to each other as shown.

As described earlier, pre-filter arrangement 100 is employed to automatically determine at least whether an input video is telecine, non-telecine progressive or non-telecine interlaced formatted, and if the input video is determined to be telecine or non-telecine interlaced formatted, automatically convert the input video to the non-telecine progressive format, before providing the input video to encoder 702 for encoding.

As described earlier, resultantly, a user of video device 700 need not be responsible for knowing the format of the input video nor for invoking the appropriate inverter or deinterlacer at the right time to properly process the input video.

Figure 8:
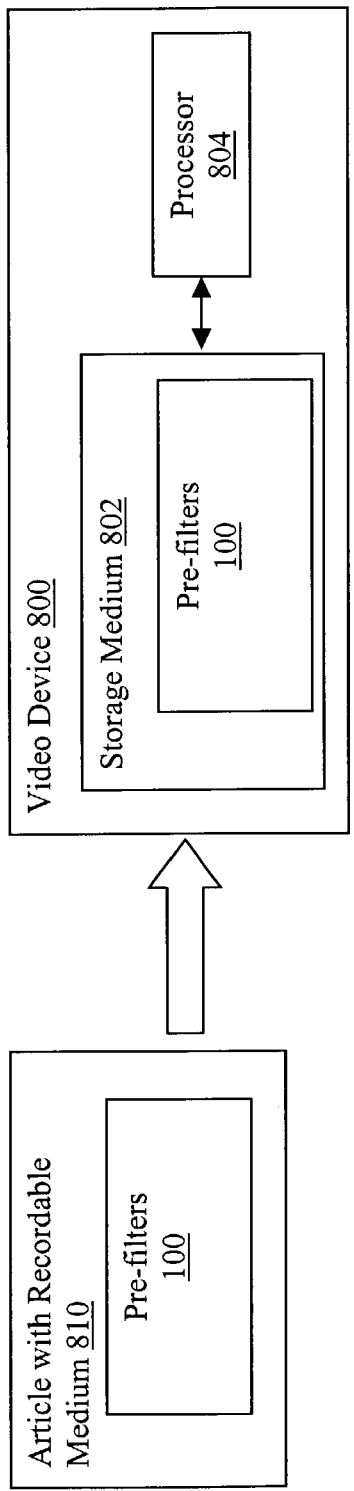
FIG. 8 illustrates a system having a video provider device incorporated with the teachings of the present invention, and a video receiver device, in accordance with one embodiment.

FIG. 8 illustrates an article of manufacture including a recordable medium 810 having programming instructions implementing a software embodiment of the earlier described pre-filter arrangement 100. Programming instructions implementing a software embodiment of pre-filter arrangement 100 are designed for use to program a video device 800 to equip video device 800 with the automatic detection and conversion capabilities of the present invention.

For the embodiment, video device 800 includes storage medium 802 to store at least a portion of a working copying of the programming instructions implementing the software embodiment of pre-filter arrangement 100, and at least one processor 804 coupled to storage medium 802 to execute the programming instructions.

Video device 800 may be any one of a number of video devices known in the art, including but not limited to video servers. Article 810 may e.g. be a diskette, a compact disk (CD), a DVD or other computer readable medium of the like. In other embodiments, article 810 may be a distribution server distributing the programming instructions implementing the present invention to video device 800 on line, via private and/or public networks, such as the Internet. In one embodiment, article 810 is a web server.

Figure 9:
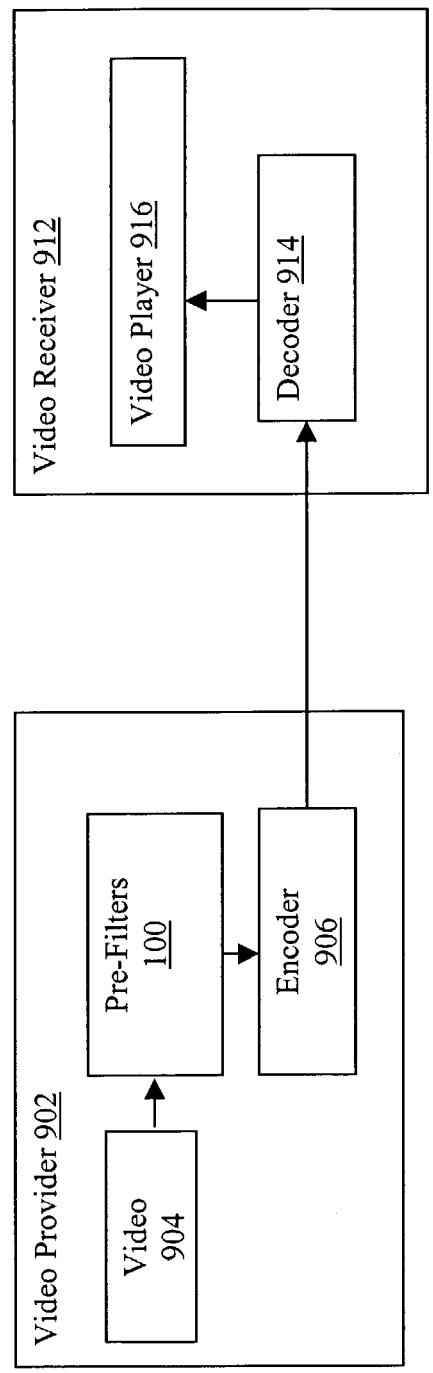
FIG. 9 illustrates a video system including a video device incorporated with the teachings of the present invention, in accordance with one embodiment.

FIG. 9 illustrates a video system including a video device incorporated with the teachings of the present invention, in accordance with one embodiment. Video provider device 902 equipped with pre-filter arrangement 100 of the present invention and encoder 906 is coupled to video receiver device 912 having decoder 914 and video player 916, and provides video receiver device 912 with streaming videos.

The format of video 904 is automatically detected, and converted if necessary, by pre-filter arrangement 100, as earlier described, before being provided to encoder 906 to be encoded and sent to video receiver device 902.

Video receiver device 912 employs decoder 914 to decode the provided video for player 916 to render for consumption by a user of video receiver device 912.

Video provider and receiver devices 902 and 912 may be any one of a number of video providing and receiving devices known in the art. Video provider 902 may e.g. be a video server. Video receiving device 912 may e.g. be a daughter card, a motherboard, a palm sized computing device, a wireless mobile phone, a digital personal assistant, a laptop computing device, a desktop computing device, a set-top box, a server, a compact disk player, a digital versatile disk player, a television, or a display monitor.

Video provider and receiver devices 902 and 912 may be coupled to each other via a wired or a wireless connection. The connection may e.g. be a bus connection, such as the Universal Serial Bus (USB), the Peripheral Component Interconnect (PCI) bus, or other buses. The connection may e.g. also be a local or wide area networking connection, such as an Ethernet, a Token Ring, Transmission Control Protocol/Internet Protocol (TCP/IP) or other networking protocols/transports of like kind.

Conclusion and Epilogue

Thus, it can be seen from the above descriptions, an improved video processing device, including methods practiced thereon, and other related aspects, have been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims.

Thus, the description is to be regarded as illustrative instead of restrictive on the present invention.

What is claimed is:

1. In a video apparatus, a method of operation comprising:
   receiving a plurality of frames of a video;
   automatically analyzing the frames to determine at least whether the video exhibits a telecine pattern;
   automatically analyzing the frames to determine whether the video is progressive or interlaced formatted, if the video does not exhibit a telecine pattern;
   automatically reformatting the video into a non-telecine progressive format if the video is determined to be one of telecine and non-telecine interlaced formatted;
   wherein said automatic analyses comprise:
      automatically analyzing the frames to determine at least whether the video is one of telecine and non-telecine progressive formatted; and
      further analyzing the frames to determine whether the video is non-telecine interlaced formatted if the video is not determined to be one of telecine and non-telecine progressive formatted;
   wherein said automatic analyzing of the frames to determine at least whether the video is one of telecine and non-telecine progressive formatted comprises:
      automatically analyzing the frames for at least interlaced and progressive patterns;
      automatically monitoring the number of frames that are consistent with having said interlaced or progressive patterns; and
      automatically inferring whether the frames are progressive formatted based at least in part on the results of said analysis of the frames for interlaced and progressive patterns, and the results of said analysis of the determined number of frames consistent with having said interlaced or progressive patterns; and
   wherein said automatic monitoring of the number of frames that are consistent with having said interlaced or progressive patterns comprises:
      automatically monitoring for dropping of selected ones of said frames;
      automatically determining amounts of elapsed times between successive frames being dropped;

automatically analyzing the determined amounts of elapsed times; and automatically inferring whether the video is progressive formatted based at least in part on the results of said analysis of the frames for interlaced and progressive patterns, and the results of said analysis of the determined amounts of elapsed times between successive frames being dropped.

2. In a video apparatus, a method of operation comprising:

receiving a plurality of frames of a video;

automatically analyzing the frames to determine at least whether the video exhibits a telecine pattern;

automatically analyzing the frames to determine whether the video is progressive or interlaced formatted, if the video does not exhibit a telecine pattern;

automatically reformatting the video into a non-telecine progressive format if the video is determined to be one of telecine and non-telecine interlaced formatted;

wherein said automatic analyses comprise:

automatically analyzing the frames to determine at least whether the video is one of telecine and non-telecine progressive formatted; and further analyzing the frames to determine whether the video is non-telecine interlaced formatted if the video is not determined to be one of telecine and non-telecine progressive formatted; and wherein said automatic analysis of the frames to determine at least whether the video is one of telecine and non-telecine progressive formatted comprises analyzing the frames for at least interlaced and progressive patterns, monitoring the number of frames that are consistent with said interlaced and progressive patterns, and setting a progressive indicator to true to denote the video is progressive formatted, if a progressive counter reaches a threshold, the progressive counter being incremented and decremented based at least in part on the results of said analysis of the frames for interlaced and progressive patterns and the results of said monitoring of the number of frames that are consistent with having said interlaced or progressive pattern.

3. In a video apparatus, a method of operation comprising:

receiving a plurality of frames of a video;

automatically analyzing the frames to determine at least whether the video exhibits a telecine pattern;

automatically analyzing the frames to determine whether the video is progressive or interlaced formatted, if the video does not exhibit a telecine pattern;

automatically reformatting the video into a non-telecine progressive format if the video is determined to be one of telecine and non-telecine interlaced formatted;

wherein said automatic analyses comprise:

automatically analyzing the frames to determine at least whether the video is one of telecine and non-telecine progressive formatted; and further analyzing the frames to determine whether the video is non-telecine interlaced formatted if the video is not determined to be one of telecine and non-telecine progressive formatted; and wherein said further analyzing of the frames to determine whether the video is non-telecine interlaced formatted comprises analyzing each of one or more of said frames for at least interlaced and progressive patterns, incrementing a detection measure whenever interlaced pattern is detected in a frame, and decrementing the detection measure whenever progressive pattern is detected in a frame.

4. In a video apparatus, a method of operation comprising:

receiving a plurality of frames of a video;

automatically analyzing the frames to determine at least whether the video exhibits a telecine pattern;

automatically analyzing the frames to determine whether the video is progressive or interlaced formatted, if the video does not exhibit a telecine pattern;

automatically reformatting the video into a non-telecine progressive format if the video is determined to be one of telecine and non-telecine interlaced formatted;

wherein said automatic analyses comprise:

automatically analyzing the frames to determine at least whether the video is one of telecine and non-telecine progressive formatted; and further analyzing the frames to determine whether the video is non-telecine interlaced formatted if the video is not determined to be one of telecine and non-telecine progressive formatted; and wherein said further analyzing of the frames to determine whether the video is non-telecine interlaced formatted further comprises for each of one or more of said frames, determining whether the frame is to be considered interlaced formatted by analyzing a plurality of pixel blocks of the frame to determine at least whether each pixel block is to be considered interlaced or progressive formatted, and determining whether the frame is to be considered interlaced formatted based at least in part on the results of said analysis of the pixel blocks of the frame.

5. In a video apparatus, a method of operation comprising:

receiving a plurality of frames of a video;

automatically analyzing the frames to determine at least whether the video exhibits a telecine pattern;

automatically analyzing the frames to determine whether the video is progressive or interlaced formatted, if the video does not exhibit a telecine pattern;

automatically reformatting the video into a non-telecine progressive format if the video is determined to be one of telecine and non-telecine interlaced formatted;

wherein said automatic analyses comprise:

automatically analyzing the frames to determine at least whether the video is one of telecine and non-telecine progressive formatted; and further analyzing the frames to determine whether the video is non-telecine interlaced formatted if the video is not determined to be one of telecine and non-telecine progressive formatted; and wherein said further analyzing of the frames to determine whether the video is non-telecine interlaced formatted comprises for each of one or more pixel blocks of each frame, computing at least one of a one step vertical difference, a two step vertical difference, a one step horizontal difference and a two step horizontal difference.

6. In a video apparatus, a method of operation comprising:

receiving a plurality of frames of a video;

automatically analyzing the frames to determine at least whether the video exhibits a telecine pattern;

automatically analyzing the frames to determine whether the video is progressive or interlaced formatted, if the video does not exhibit a telecine pattern;

automatically reformatting the video into a non-telecine progressive format if the video is determined to be one of telecine and non-telecine interlaced formatted;

wherein said automatic analyses comprise:
  automatically analyzing the frames to determine at least whether the video is one of telecine and non-telecine progressive formatted; and
  further analyzing the frames to determine whether the video is non-telecine interlaced formatted if the video is not determined to be one of telecine and non-telecine progressive formatted; and
wherein said further analyzing of the frames to determine whether the video is non-telecine interlaced formatted comprises for each of one or more pixel blocks of each frame, determining whether the pixel block comprises sufficient number of pixels associated with movement.

7. The method of claim 6, wherein said determining of whether the pixel block comprises sufficient number of pixels associated with movement comprises computing difference measures for pixel values of the pixel block and pixel values of a spatially corresponding pixel block of a previous frame for a plurality of lines.

8. In a video apparatus, a method of operation comprising:
  receiving a plurality of frames of a video;
  analyzing the frames for at least one of interlaced and progressive patterns;
  monitoring the number of frames that are consistent with having said interlaced or progressive patterns; and
  inferring whether the video is progressive formatted based at least in part on the results of said analysis of the frames for interlaced and progressive patterns, and the results of said monitoring of the number of frames that are consistent with having said interlaced or progressive patterns;
  wherein said monitoring of the number of frames that are consistent with having said interlaced or progressive patterns comprises:
  monitoring for dropping of selected ones of said frames;
  determining lengths of elapsed times between successive frames being dropped;
  analyzing the determined lengths of elapsed times; and
  inferring whether the video is progressive formatted based at least in part on the results of said analysis of the frames for interlaced and progressive patterns, and said analysis of the determined lengths of elapsed times between successive frames being dropped.

9. The method of claim 8, wherein said analysis of the determined amounts of elapsed times comprises analyzing the determined amounts of elapsed times to determine whether the amounts of elapsed times are substantially consistent with an expected amount of elapsed time.

10. The method of claim 9, wherein said analysis of the determined amounts of elapsed times to determine whether the amounts of elapsed times are substantially consistent with an expected amount of elapsed time comprises for each determined amount of elapsed time,
  determining whether the determined amount of elapsed time is more than a first amount, but not more than a second amount, and
  incrementing a selected one of a progressive counter and an interlaced counter by an increment amount if the amount of elapsed time is more than the first amount, but not more than a second amount.

11. The method of claim 10, wherein said incrementing of a selected one of a progressive counter and an interlaced counter by an increment amount comprises incrementing the selected progressive/interlaced counter by 5.

12. The method of claim 10, wherein the first and second amounts of elapsed times equal 145 ms and 175 ms respectively.

13. The method of claim 10, wherein said analysis of the determined amounts of elapsed times to determine whether the amounts of elapsed times are substantially consistent with an expected amount of elapsed time further comprises for each determined amount of elapsed time, decrementing the unelected one of the progressive and interlaced counters by a decrement amount whenever the selected one of the progressive and interlaced counters is incremented by the increment amount.

14. The method of claim 13, wherein the increment amount and the decrement amount equal one another.

15. The method of claim 10, wherein said analysis of the determined amounts of elapsed times to determine whether the amounts of elapsed times are substantially consistent with an expected amount of elapsed time further comprises for each determined amount of elapsed time, decrementing a selected one of the progressive and interlaced counters by a decrement amount whenever the amount of elapsed time is less than a third amount, but not more than the first amount and less than the second amount.

16. The method of claim 15, wherein said decrementing of a selected one of the progressive and interlaced counters by a decrement amount comprises decrementing the selected progressive/interlaced counter by 5.

17. The method of claim 15, wherein the first, second and third amounts equal 145 ms, 175 ms and 300 ms respectively.

18. The method of claim 15, wherein the selected one of the progressive and interlaced counters is the progressive counter when progressive pattern is detected in the frame, and the interlaced counter when interlaced pattern in detected in the frame.

19. The method of claim 10, wherein the selected one of the progressive and interlaced counters is the progressive counter when progressive pattern is detected in the frame, and the interlaced counter when interlaced pattern in detected in the frame.

20. The method of claim 10, wherein said inferring comprises setting a progressive indicator to true to denote the video is progressive formatted if the progressive counter reaches a threshold.

21. The method of claim 20, wherein the progressive counter is initialized to zero, said increment amount equals 5, and the threshold equals 100.

22. In a video apparatus, a method of operation comprising:
  receiving one or more frames of a video;
  analyzing each of one or more of said frames to determine whether the frame is to be considered interlaced formatted; and
  inferring that the video is to be considered as interlaced formatted based at least in part on the results of said analysis of each of one or more of said frames, including incrementing a detection measure when an interlaced pattern is detected in a frame, decrementing the detection measure when a progressive pattern is detected in a frame, and inferring based at least in part on a state of the detection measure;
  wherein said incrementing of a detection measure when the interlaced pattern is detected in a frame comprises setting the detection measure to a quotient computed by dividing a selected one of sum of 31* the detection measure and 256, and 31* the detection measure, by 32.

23. The method of claim 22, wherein said analyzing of whether each of one or more frames is to be considered interlaced formatted comprises for each frame, analyzing a plurality of pixel blocks of the frame to determine at least whether each pixel block is to be considered interlaced or progressive formatted, and inferring whether the frame is to be considered interlaced formatted, based at least in part on the results of said analysis of the pixel blocks of the frame.

24. The method of claim 22, wherein said analyzing of whether each of one or more frames is to be considered interlaced formatted comprises for each frame, estimating a number of interlaced formatted pixel blocks and a number of progressive formatted pixel blocks based at least in part on the results of the analysis of the pixel blocks of the frame.

25. The method of claim 22, wherein said analyzing of whether each of one or more frames is to be considered interlaced formatted comprises for each frame, determining whether a number of pixel blocks of the frame to be considered interlaced formatted is greater than a number of pixel blocks of the frame to be considered progressive formatted.

26. In a video apparatus, a method of operation comprising:
  receiving a plurality of frames of a video;
  analyzing each of one or more of said frames to determine whether the frame is to be considered interlaced formatted; and
  inferring whether the video is to be considered as interlaced formatted based at least in part on the results of said analysis of each of one or more of said frames, including incrementing a detection measure when interlaced pattern is detected in a frame, decrementing the detection measure when progressive pattern is detected in a frame, and inferring based at least in part on a state of the detection measure;
  wherein said analyzing of whether each of one or more frames is to be considered interlaced formatted comprises for each frame, determining whether a number of pixel blocks of the frame to be considered interlaced formatted is greater than a quotient computed by dividing a product of a width of the frame (in units of pixels) and a height of the frame (in units of pixels) by a constant.

27. The method of claim 26, wherein said analyzing of whether each of one or more frames is to be considered interlaced formatted comprises for each frame, determining whether a product of a cumulative one step vertical differences and a cumulative two steps horizontal differences is greater than the product of a cumulative one step horizontal differences and a cumulative two steps vertical differences.

28. The method of claim 26, wherein said analyzing of whether each of one or more frames is to be considered interlaced formatted comprises for each frame, determining whether a cumulative one step vertical differences is greater than a cumulative two steps vertical differences.

29. The method of claim 26, wherein said analyzing of whether each of one or more frames is to be considered interlaced formatted comprises for each frame, determining whether a number of pixel blocks of the frame to be considered interlaced formatted is greater than a number of pixel blocks of the frame to be considered progressive formatted by at least a multiple.

30. In a video apparatus, a method of operation comprising:
  receiving a plurality of frames of a video;
  analyzing each of one or more of said frames to determine whether the frame is to be considered interlaced formatted; and
  inferring whether the video is to be considered as interlaced formatted based at least in part on the results of said analysis of each of one or more of said frames, including incrementing a detection measure when interlaced pattern is detected in a frame, decrementing the detection measure when progressive pattern is detected in a frame, and inferring based at least in part on a state of the detection measure;
  wherein said analyzing of whether each of one or more frames is to be considered interlaced formatted comprises for each frame, determining whether a number of pixel blocks of the frame to be considered progressive formatted is greater than a quotient computed by dividing a product of a width of the frame (in units of pixels) and a height of the frame (in units of pixels) by a constant.

31. The method of claim 30, wherein said analyzing of whether each of one or more frames is to be considered interlaced formatted comprises for each frame, determining whether a number of pixel blocks of the frame to be considered progressive formatted is greater than a number of pixel blocks of the frame to be considered interlaced formatted by at least a multiple.

32. The method of claim 30 wherein said analyzing of whether each of one or more frames is to be considered interlaced formatted comprises for each of one or more pixel blocks of each frame, determining whether the pixel block comprises sufficient number of pixels associated with movement.

33. The method of claim 32, wherein said determining of whether the pixel block comprises sufficient number of pixels associated with movement comprises computing difference measures of pixel values of the pixel block and pixel values of a spatially corresponding pixel block of a previous frame for a plurality of lines.

34. The method of claim 33, wherein said analyzing of whether each of one or more frames is to be considered interlaced formatted farther comprises for each of one or more pixel blocks of selected one or more frames, computing at least one of a one step vertical difference, a two step vertical difference, an one step horizontal difference and a two step horizontal difference.

35. In a video apparatus, a method of operation comprising:
  receiving a plurality of pixel blocks of a frame of video;
  analyzing each of one or more of said pixel blocks of the frame to determine whether the pixel is to be considered interlaced formatted, including determining whether the pixel block comprises sufficient number of pixels associated with movement; and
  inferring whether the frame is to be considered as interlaced formatted based at least in part on the results of said analysis of each one or more of said pixel blocks;
  wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;
  wherein the dimensions of said pixel block is M pixels wide and N pixels high, and the difference measures comprise sum of differences for even lines (SAD_even) computed by computing $$\text{SAD\_even} = \sum_{i=0}^{M-1} \sum_{j=0}^{N/2-} |p(i, 2j) - q(i, 2j)|$$

where p(x,y) is a pixel value located x pixels to the right and y pixels down from a reference point of the pixel block;

q(x,y) is a pixel value located at a corresponding position in the previous frame.

36. In a video apparatus, a method of operation comprising:

receiving a plurality of pixel blocks of a frame of video;

analyzing each of one or more of said pixel blocks of the frame to determine whether the pixel is to be considered interlaced formatted, including determining whether the pixel block comprises sufficient number of pixels associated with movement;

and inferring whether the frame is to be considered as interlaced formatted based at least in part on the results of said analysis of each one or more of said pixel blocks;

wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;

wherein the dimensions of said pixel block is M pixels wide and N pixels high, and the difference measures comprise sum of differences for odd lines (SAD_odd) computed by computing $$SAD\_odd = \sum_{i=0}^{M-1} \sum_{j=0}^{N/2-1} |p(i, 2j+1) - q(i, 2j+1)|$$

where p(x,y) is a pixel value located x pixels to the right and y pixels down from a reference point of the pixel block;

q(x,y) is a pixel value located at a corresponding position in the previous frame.

37. In a video apparatus, a method of operation comprising:

receiving a plurality of pixel blocks of a frame of video;

analyzing each of one or more of said pixel blocks of the frame to determine whether the pixel is to be considered interlaced formatted, including determining whether the pixel block comprises sufficient number of pixels associated with movement;

and inferring whether the frame is to be considered as interlaced formatted based at least in part on the results of said analysis of each one or more of said pixel blocks;

wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;

wherein the dimensions of said pixel block is M pixels wide and N pixels high, and the difference measures comprise sum of differences for even lines (SAD_even) computed by computing $$SAD\_even = 2 \sum_{i=0}^{M/2-1} \sum_{j=0}^{N/2-1} |p(2i, 2j) - q(2i, 2j)|$$

where p(x,y) is a pixel value located x pixels to the right and y pixels down from a reference point of the pixel block;

q(x,y) is a pixel value located at a corresponding position in the previous frame.

38. In a video apparatus, a method of operation comprising:

receiving a plurality of pixel blocks of a frame of video;

analyzing each of one or more of said pixel blocks of the frame to determine whether the pixel is to be considered interlaced formatted, including determining whether the pixel block comprises sufficient number of pixels associated with movement;

and inferring whether the frame is to be considered as interlaced formatted based at least in part on the results of said analysis of each one or more of said pixel blocks;

wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;

wherein the dimensions of said pixel block is M pixels wide and N pixels high, and the difference measures comprise sum of differences for odd lines (SAD_odd) computed by computing $$SAD\_odd = 2 \sum_{i=0}^{M/2-1} \sum_{j=0}^{N/2-1} |p(2i+1, 2j+1) - q(2i+1, 2j+1)|$$

where p(x,y) is a pixel value located x pixels to the right and y pixels down from a reference point of the pixel block;

q(x,y) is a pixel value located at a corresponding position in the previous frame.

39. In a video apparatus, a method of operation comprising:

receiving a plurality of pixel blocks of a frame of video;

analyzing each of one or more of said pixel blocks of the frame to determine whether the pixel is to be considered interlaced formatted, including determining whether the pixel block comprises sufficient number of pixels associated with movement;

and inferring whether the frame is to be considered as interlaced formatted based at least in part on the results of said analysis of each one or more of said pixel blocks;

wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;

wherein the dimensions of each of the one or more said pixel blocks is M pixels wide and N pixels high, and said analyzing of whether each of the one or more pixel blocks is to be considered interlaced formatted further includes computing for the pixel block, a one step vertical difference (step1v), by computing $$steplv = \sum_{i=0}^{M/2-1} \sum_{j=0}^{N/2-1} (p(2i+1, 2j) - p(2i+1, 2j+1))^2$$

where p(x,y) is a pixel value located x pixels to the right and y pixels down from a reference point of the pixel block.

40. In a video apparatus, a method of operation comprising:
receiving a plurality of pixel blocks of a frame of video;
analyzing each of one or more of said pixel blocks of the frame to determine whether the pixel is to be considered interlaced formatted, including determining whether the pixel block comprises sufficient number of pixels associated with movement;
and inferring whether the frame is to be considered as interlaced formatted based at least in part on the results of said analysis of each one or more of said pixel blocks;
wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;
wherein the dimensions of each of the one or more said pixel blocks is M pixels wide and N pixels high, and said analyzing of whether each of the one or more pixel blocks is to be considered interlaced formatted further includes computing for the pixel block, a two step vertical difference (step2v), by computing $$step2v = \sum_{i=0}^{M/2-1} \sum_{j=0}^{N/2-1} (p(2i+1, 2j) - p(2i+1, 2j+2))^2$$

where p(x,y) is a pixel value located x pixels to the right and y pixels down from a reference point of the pixel block.

41. In a video apparatus, a method of operation comprising:
receiving a plurality of pixel blocks of a frame of video;
analyzing each of one or more of said pixel blocks of the frame to determine whether the pixel is to be considered interlaced formatted, including determining whether the pixel block comprises sufficient number of pixels associated with movement;
and inferring whether the frame is to be considered as interlaced formatted based at least in part on the results of said analysis of each one or more of said pixel blocks;
wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;
wherein the dimensions of each of the one or more said pixel blocks is M pixels wide and N pixels high, and said analyzing of whether each of the one or more pixel blocks is to be considered interlaced formatted further includes computing for the pixel block, a one step horizontal difference (step1h), by computing $$step1h = \sum_{i=0}^{M/2-1} \sum_{j=0}^{N/2-1} (p(2i, 2j+1) - p(2i+1, 2j+1))^2$$

where p(x,y) is a pixel value located x pixels to the right and y pixels down from a reference point of the pixel block.

42. In a video apparatus, a method of operation comprising:
receiving a plurality of pixel blocks of a frame of video;
analyzing each of one or more of said pixel blocks of the frame to determine whether the pixel is to be considered interlaced formatted, including determining whether the pixel block comprises sufficient number of pixels associated with movement;
and inferring whether the frame is to be considered as interlaced formatted based at least in part on the results of said analysis of each one or more of said pixel blocks;
wherein said determining of whether the pixel block comprises sufficient number of pixels associated with movement comprises computing one or more difference measures of pixel values of the pixel block and pixel values of a spatially corresponding pixel block of a previous frame for a plurality of lines of the video;
wherein the dimensions of each of the one or more said pixel blocks is M pixels wide and N pixels high, and said analyzing of whether each of the one or more pixel blocks is to be considered interlaced formatted further includes computing for the pixel block, a two step vertical difference (step 2h), by computing $$step2h = \sum_{i=0}^{M/2-1} \sum_{j=0}^{N/2-1} (p(2i, 2j+1) - p(2i+2, 2j+1))^2$$

where p(x,y) is a pixel value located x pixels to the right and y pixels down from a reference point of the pixel block.

43. A video apparatus comprising:
storage medium having stored therein a plurality of programming instructions designed to enable the apparatus to;
receive a plurality of frames of a video;
automatically analyze the frames to determine at least whether the video exhibits a telecine pattern,
automatically analyze the frames to determine whether the video is progressive or interlaced formatted if the video does not exhibit a telecine pattern, and
automatically reformat the video into a non-telecine progressive format if the video is determined to be one of telecine and non-telecine interlaced formatted;
at least one processor coupled with the storage medium to execute the programming instructions;
wherein said programming instructions are designed to perform said automatic analyzes by:
automatically analyzing the frames to determine at least whether the video is one of telecine and non-telecine progressive formatted; and
further analyzing the frames to determine whether the video is non-telecine interlaced formatted if the video is not determined to be one of telecine and non-telecine progressive formatted;

wherein said programming instructions are designed to perform said automatic analyzing of the frames to determine at least whether the video is one of telecine and non-telecine progressive formatted by:
  automatically analyzing the frames for at least interlaced and progressive patterns;
  automatically monitoring the number of frames that are consistent with having said interlaced or progressive patterns;
  automatically inferring whether the frames are progressive formatted based at least in part on the results of said analysis of the frames for interlaced and progressive patterns, and the results of said analysis of the determined number of frames consistent with having said interlaced or progressive patterns; and
wherein said programming instructions are designed to perform said automatic monitoring of the number of frames that are consistent with having said interlaced or progressive patterns by:
  automatically monitoring for dropping of selected ones of said frames;
  automatically determining amounts of elapsed times between successive frames being dropped;
  automatically analyzing the determined amounts of elapsed times; and
  automatically inferring whether the video is progressive formatted based at least in part on the results of said analysis of the frames for interlaced and progressive patterns, and the results of said analysis of the determined amounts of elapsed times between successive frames being dropped.

44. A video apparatus comprising:
storage medium having stored therein a plurality of programming instructions designed to enable the video apparatus to:
  receive a plurality of frames of a video,
  analyze the frames for at least interlaced and progressive patterns,
  monitor the number of frames that are consistent with having said interlaced or progressive patterns, and
  infer whether the video is progressive formatted based at least in part on the results of said analysis of the frames for interlaced and progressive patterns, and the results of said monitoring of the number of frames that are consistent with having said interlaced or progressive patterns; and
a processor coupled to the storage medium to execute the programming instructions;
wherein said programming instructions are designed to perform said monitoring of the number of frames that are consistent with having said interlaced or progressive patterns by
  monitoring for dropping of selected ones of said frames,
  determining lengths of elapsed times between successive frames being dropped;
  analyzing the determined lengths of elapsed times; and
  inferring whether the video is progressive formatted based at least in part on the results of said analysis of the frames for interlaced and progressive patterns, and said analysis of the determined lengths of elapsed times between successive frames being dropped;
wherein said programming instructions are designed to perform said analysis of the determined amounts of elapsed times by analyzing the determined lengths of elapsed times to determine whether the lengths of elapsed times are substantially consistent with an expected lengths of elapsed time.

45. The video apparatus of claim 44, wherein said programming instructions are designed to perform said analysis of the determined amounts of elapsed times to determine whether the amounts of elapsed times are substantially consistent with an expected amount of elapsed time by performing, for each determined amount of elapsed time,
  determining whether the determined amount of elapsed time is more than a first amount, but not more than a second amount, and
  incrementing a selected one of a progressive counter and an interlaced counter by an increment amount if the amount of elapsed time is more than the first amount, but not more than a second amount.

46. The video apparatus of claim 45, wherein said programming instructions are designed to perform said incrementing of a selected one of a progressive counter and an interlaced counter by an increment amount by incrementing the selected progressive/interlaced counter by 5.

47. The video apparatus of claim 45, wherein the first and second amounts of elapsed times equal 145 ms and 175 ms respectively.

48. The video apparatus of claim 45, wherein said programming instructions are designed to perform said analysis of the determined amounts of elapsed times to determine whether the amounts of elapsed times are substantially consistent with an expected amount of elapsed time by further performing, for each determined amount of elapsed time, decrementing the unselected one of the progressive and interlaced counters by a decrement amount whenever the selected one of the progressive and interlaced counters is incremented by the increment amount.

49. The video apparatus of claim 48, wherein the increment amount and the decrement amount equal one another.

50. The video apparatus of claim 45, wherein said programming instructions are designed to perform said analysis of the determined amounts of elapsed times to determine whether the amounts of elapsed times are substantially consistent with an expected amount of elapsed time by further performing, for each determined amount of elapsed time, decrementing a selected one of the progressive and interlaced counters by a decrement amount whenever the amount of elapsed time is less than a third amount, but not more than the first amount and less than the second amount.

51. The video apparatus of claim 50, wherein said programming instructions are designed to perform said decrementing of a selected one of the progressive and interlaced counters by a decrement amount by decrementing the selected progressive/interlaced counter by 5.

52. The video apparatus of claim 50, wherein the first, second and third amounts equal 145 ms, 175 ms and 300 ms respectively.

53. The video apparatus of claim 50, wherein the selected one of the progressive and interlaced counters is the progressive counter when progressive pattern is detected in the frame, and the interlaced counter when interlaced pattern in detected in the frame.

54. The video apparatus of claim 45, wherein the selected one of the progressive and interlaced counters is the progressive counter when progressive pattern is detected in the frame, and the interlaced counter when interlaced pattern in detected in the frame.

55. The video apparatus of claim 45, wherein said programming instructions are designed to perform said inferring by setting a progressive indicator to true to denote the video is progressive formatted if the progressive counter reaches a threshold.

56. The video apparatus of claim 55, wherein said programming instructions are further designed to initialize the progressive counter to zero, said increment amount to 5, and the threshold to 100.

57. A video apparatus, comprising:
storage medium having stored therein a plurality of programming instructions designed to enable the apparatus to:
receive a plurality of frames of a video,
analyze each of one or more of said frames to determine whether the frame is to be considered interlaced formatted, and
infer whether the video is to be considered as interlaced formatted based at least in part on the results of said analysis of each of one or more of said frames; and
a processor coupled to the storage medium to execute the programming instructions
wherein said programming instructions are designed to perform said inferring by incrementing a detection measure when interlaced pattern is detected in a frame, decrementing the detection measure when progressive pattern is detected in a frame, and inferring based at least in part on a state of the detection measure;
wherein said programming instructions are designed to perform said incrementing of a detection measure when interlaced pattern is detected in a frame by setting the detection measure to a quotient computed by dividing a selected one of sum of 31* detection measure and 256, and 31* detection measure, by 32.

58. The video apparatus of claim 57, wherein said programming instructions are designed to perform said analyzing of whether each of one or more frames is to be considered interlaced formatted by analyzing, for each frame, a plurality of pixel blocks of the frame to determine at least whether each pixel block is to be considered interlaced or progressive formatted, and inferring whether the frame is to be considered interfaced formatted, based at least in part on the results of said analysis of the pixel blocks of the frame.

59. The video apparatus of claim 57, wherein said programming instructions are designed to perform said analyzing of whether each of one or more frames is to be considered interlaced formatted by estimating, for each frame, a number of interlaced formatted pixel blocks and a number of progressive formatted pixel blocks based at least in part on the results of the analysis of the pixel blocks of the frame.

60. The video apparatus of claim 57, wherein said programming instructions are designed to perform said analyzing of whether each of one or more frames is to be considered interlaced formatted by determining, for each frame, whether a number of pixel blocks of the frame to be considered interlaced formatted is greater than a number of pixel blocks of the frame to be considered progressive formatted.

61. A video apparatus, comprising:
storage medium having stored therein a plurality of programming instructions designed to enable the apparatus to:
receive a plurality of frames of a video,
analyze each of one or more of said frames to determine whether the frame is to be considered interlaced formatted, and
infer that the video is to be considered as interlaced formatted based at least in part on the results of said analysis of each of one or more of said frames; and
a processor coupled to the storage medium to execute the programming instructions
wherein said programming instructions are designed to perform said inferring by incrementing a detection measure when an interlaced pattern is detected in a frame, decrementing the detection measure when a progressive pattern is detected in a frame, and inferring based at least in part on a state of the detection measure;
wherein said programming instructions are designed to perform said analyzing of whether each of one or more frames is to be considered interlaced formatted by determining, for each frame, whether a number of pixel blocks of the frame to be considered interlaced formatted is greater than a quotient computed by dividing a product of a width of the frame (in units of pixels) and a height of the frame (in units of pixels) by a constant.

62. The video apparatus of claim 61, wherein said programming instructions are designed to perform said analyzing of whether each of one or more frames is to be considered interlaced formatted by determining, for each frame, whether a product of a cumulative one step vertical differences and a cumulative two steps horizontal differences is greater than the product of a cumulative one step horizontal differences and a cumulative two steps vertical differences.

63. The video apparatus of claim 61, wherein said programming instructions are designed to perform said analyzing of whether each of one or more frames is to be considered interlaced formatted by determining, for each frame, whether a cumulative one step vertical differences is greater than a cumulative two steps vertical differences.

64. The video apparatus of claim 61, wherein said programming instructions are designed to perform said analyzing of whether each of one or more frames is to be considered interlaced formatted by determining, for each frame, whether a number of pixel blocks of the frame to be considered interlaced formatted is greater than a number of pixel blocks of the frame to be considered progressive formatted by at least a multiple.

65. A video apparatus comprising:
storage medium having stored therein a plurality of programming instructions designed to enable the apparatus to:
receive a plurality of frames of a video,
analyze each of one or more of said frames to determine whether the frame is to be considered interlaced formatted, and
infer that the video is to be considered as interlaced formatted based at least in part on the results of said analysis of each of one or more of said frames; and
a processor coupled to the storage medium to execute the programming instructions
wherein said programming instructions are designed to perform said inferring by incrementing a detection measure when interlaced pattern is detected in a frame, decrementing the detection measure when progressive pattern is detected in a frame, and inferring based at least in part on a state of the detection measure;
wherein said programming instructions are designed to perform said analyzing of whether each of one or more frames is to be considered interlaced formatted by determining, for each frame, whether a number of pixel blocks of the frame to be considered progressive formatted is greater than a quotient computed by dividing a product of a width of the frame (in units of pixels) and a height of the frame (in units of pixels) by a constant.

66. A video apparatus, comprising:
storage medium having stored therein a plurality of programming instructions designed to enable the apparatus to:
receive a plurality of frames of a video,
analyze each of one or more of said frames to determine whether the frame is to be considered interlaced formatted, and
infer whether the video is to be considered as interlaced formatted based at least in part on the results of said analysis of each of one or more of said frames; and
a processor coupled to the storage medium to execute the programming instructions
wherein said programming instructions are designed to perform said inferring by incrementing a detection measure when interlaced pattern is detected in a frame, decrementing the detection measure when progressive pattern is detected in a frame, and inferring based at least in part on a state of the detection measure;
wherein said programming instructions are designed to perform wherein said analyzing of whether each of one or more frames is to be considered interlaced formatted by determining, for each frame, whether a number of pixel blocks of the frame to be considered progressive formatted is greater than a number of pixel blocks of the frame to be considered interlaced formatted by at least a multiple.

67. The video apparatus of claim 66, wherein said programming instructions are designed to perform said analyzing of whether each of one or more frames is to be considered interlaced formatted by determining, for each of one or more pixel blocks of each frame, whether the pixel block comprises sufficient number of pixels associated with movement.

68. The video apparatus of claim 67, wherein said programming instructions are designed to perform said determining of whether the pixel block comprises sufficient number of pixels associated with movement by computing difference measures of pixel values of the pixel block and pixel values of a spatially corresponding pixel block of a previous frame for a plurality of lines.

69. The video apparatus of claim 68, wherein said programming instructions are designed to perform said analyzing of whether each of one or more frames is to be considered interlaced formatted further by computing, for each of one or more pixel blocks of selected one or more frames, at least one of a one step vertical difference, a two step vertical difference, a one step horizontal difference and a two step horizontal difference.

70. A video apparatus comprising:
storage medium having stored therein a plurality of programming instructions designed to enable the video apparatus to:
receive one or more pixel blocks of a frame of a video,
analyze each of the one or more pixel blocks of the frame to determine whether the pixel block is to be considered interlaced formatted, including determining whether the pixel block comprises a sufficient number of pixels associated with movement, and
infer whether the frame is to be considered as interlaced formatted based at least in part on the results of said analysis of each of one or more of said pixel blocks; and
a processor coupled to the storage medium to execute the programming instructions;
wherein said programming instructions are designed to perform said determining of whether the pixel block comprises sufficient number of pixels associated with movement by computing one or more difference measures of pixel values of the pixel block and pixel values of a spatially corresponding pixel block of a previous frame for a plurality of lines;
wherein the dimensions of said pixel block is M pixels wide and N pixels high, and the difference measures comprise sum of differences for even lines (SAD_even) computed by computing $$\text{SAD\_even} = \sum_{i=0}^{M-1} \sum_{j=0}^{N/2-1} |p(i, 2j) - q(i, 2j)|$$

where p(x,y) is a pixel value located x pixels to the right and y pixels down from a reference point of the pixel block;
q(x,y) is a pixel value located at a corresponding position in the previous frame.

71. The video apparatus of claim 70, wherein the dimensions of said pixel block is M pixels wide and N pixels high, and the difference measures comprise sum of differences for odd lines (SAD_odd) computed by computing $$\text{SAD\_odd} = \sum_{i=0}^{M-1} \sum_{j=0}^{N/2-1} |p(i, 2j+1) - q(i, 2j+1)|$$

where p(x,y) is a pixel value located x pixels to the right and y pixels down from a reference point of the pixel block;
q(x,y) is a pixel value located at a corresponding position in the previous frame.

72. The video apparatus of claim 70, wherein the dimensions of said pixel block is M pixels wide and N pixels high, and the difference measures comprise sum of differences for even lines (SAD_even) computed by computing $$\text{SAD\_even} = 2 \sum_{i=0}^{M/2-1} \sum_{j=0}^{N/2-1} |p(2i, 2j) - q(2i, 2j)|$$

where p(x,y) is a pixel value located x pixels to the right and y pixels down from a reference point of the pixel block;
q(x,y) is a pixel value located at a corresponding position in the previous frame.

73. The video apparatus of claim 70, wherein the dimensions of said pixel block is M pixels wide and N pixels high, and the difference measures comprise sum of differences for odd lines (SAD_odd) computed by computing $$\text{SAD\_odd} = 2 \sum_{i=0}^{M/2-1} \sum_{j=0}^{N/2-1} |p(2i+1, 2j+1) - q(2i+1, 2j+1)|$$

where p(x,y) is a pixel value located x pixels to the right and y pixels down from a reference point of the pixel block;

q(x,y) is a pixel value located at a corresponding position in the previous frame.

74. The video apparatus of claim 70, wherein the dimensions of each of the one or more said pixel blocks is M pixels wide and N pixels high, and said analyzing of whether each of the one or more pixel blocks is to be considered interlaced formatted further includes computing for the pixel block, a one step vertical difference (Step1v), by computing $$step1v = \sum_{i=0}^{M/2-1}\sum_{j=0}^{N/2-1} (p(2i+1, 2j) - p(2i+1, 2j+1))^2$$

where p(x,y) is a pixel value located x pixels to the right and y pixels clown from a reference point of the pixel block.

75. The video apparatus of claim 70, wherein the dimensions of each of the one or more said pixel blocks is M pixels wide and N pixels high, and said analyzing of whether each of the one or more pixel blocks is to be considered interlaced formatted further includes computing for the pixel block, a two step vertical difference (step2v), by computing $$step2v = \sum_{i=0}^{M/2-1}\sum_{j=0}^{N/2-1} (p(2i+1, 2j) - p(2i+1, 2j+2))^2$$

where p(x,y) is a pixel value located x pixels to the right and y pixels down from a reference point of the pixel block.

76. The video apparatus of claim 70, wherein the dimensions of each of the one or more said pixel blocks is M pixels wide and N pixels high, and said analyzing of whether each of the one or more pixel blocks is to be considered interlaced formatted further includes computing for the pixel block, a one step horizontal difference (step1h), by computing $$step1h = \sum_{i=0}^{M/2-1}\sum_{j=0}^{N/2-1} (p(2i, 2j+1) - p(2i+1, 2j+1))^2$$

where p(x,y) is a pixel value located x pixels to the right and y pixels down from a reference point of the pixel block.

77. The video apparatus of claim 70, wherein the dimensions of each of the one or more said pixel blocks is M pixels wide and N pixels high, and said analyzing of whether each of the one or more pixel blocks is to be considered interlaced formatted further includes computing for the pixel block, a two step vertical difference (step2h), by computing $$step2h = \sum_{i=0}^{M/2-1}\sum_{j=0}^{N/2-1} (p(2i, 2j+1) - p(2i+2, 2j+1))^2$$

where p(x,y) is a pixel value located x pixels to the right and y pixels down from a reference point of the pixel block.

* * * * *